(12) United States Patent
Pajevic et al.

(10) Patent No.: US 11,407,590 B1
(45) Date of Patent: Aug. 9, 2022

(54) ROTARY UNIT MANAGEMENT FOR A DRIVE UNIT

(71) Applicant: Amazon Technologies, Inc., Seattle, WA (US)

(72) Inventors: Dragan Pajevic, Arlington, MA (US); Allan Katz, Londonderry, NH (US); Mark Anthony Begley, West Barnstable, MA (US); Timothy Joseph Jordan, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 15/931,070

(22) Filed: May 13, 2020

(51) Int. Cl.
*G06F 7/00* (2006.01)
*B65G 1/137* (2006.01)
*B66F 9/06* (2006.01)
*G05D 1/02* (2020.01)
*B66F 9/12* (2006.01)

(52) U.S. Cl.
CPC ............ *B65G 1/1373* (2013.01); *B66F 9/063* (2013.01); *B66F 9/12* (2013.01); *G05D 1/0217* (2013.01); *G05D 2201/0216* (2013.01)

(58) Field of Classification Search
CPC .......... B65G 1/1373; B66F 9/063; B66F 9/12; G05D 1/0217; G05D 2201/0216
USPC ................................. 700/213–216, 218, 228
See application file for complete search history.

(56) References Cited

U.S. PATENT DOCUMENTS

| 10,549,916 | B2 | 2/2020 | Pajevic et al. | |
|---|---|---|---|---|
| 2013/0302132 | A1* | 11/2013 | D'Andrea | G05D 1/0297 |
| | | | | 414/807 |
| 2014/0085556 | A1* | 3/2014 | Yin | G02F 1/1362 |
| | | | | 349/43 |
| 2018/0281191 | A1* | 10/2018 | Sinyavskiy | G05D 1/0214 |
| 2019/0243386 | A1* | 8/2019 | Lee | G05D 1/0891 |
| 2021/0089040 | A1* | 3/2021 | Ebrahimi Afrouzi | |
| | | | | A47L 9/2894 |

\* cited by examiner

*Primary Examiner* — Yolanda R Cumbess
(74) *Attorney, Agent, or Firm* — Patterson + Sheridan, LLP (57) ABSTRACT

Method and apparatus for identifying a relative rotation between a rotary unit and a base unit in a drive unit, receiving a command that changes the relative rotation when the command is executed by the drive unit, determining that rotating at least one of the base unit or the rotary unit in a first direction in response to the command results in the relative rotation exceeding a maximum rotation value, and rotating at least one of the base unit or the rotary unit in a second direction opposite the first direction while executing the command. In one example, the drive unit may include cables that transfer power and control signals from the base unit to the rotary unit. Determining whether executing the command results in the relative rotation exceeding the maximum rotation value can ensure the cables are not damaged.

20 Claims, 8 Drawing Sheets

ROTARY UNIT MANAGEMENT FOR A DRIVE UNIT

BACKGROUND

The present invention relates to managing a rotary unit mounted on a drive unit, and more specifically, to limiting a relative rotation between the rotary unit and a base unit.

Movement of products in a modern warehouse environment, such as a package sort center, in which packages are moved within a facility, occurs on a vast scale. One means to sort packages (i.e., payloads) is to use drive units to deliver packages to destinations designated by the ultimate final destination of the package. For example, drive units can be used to organize packages based on delivery route, as determined based on a postal code or other package features. Drive units can be self-powered, semi-autonomous robotic devices that travel on the floor of the warehouse guided by, for example, fiducial markers in or on the floor.

Drive units can use different mechanisms for loading, transporting, and unloading payloads. One type of drive unit includes a rotary unit mounted on top of a base unit that can rotate or spin relative to the base unit. Further, the rotary unit can include a conveyor belt or lift for loading and unloading packages.

BRIEF DESCRIPTION OF DRAWINGS

Various embodiments in accordance with the present disclosure will be described with reference to the drawings, where like designations denote like elements.

DETAILED DESCRIPTION

Embodiments herein describe limiting a relative rotation between a rotary unit and a base unit of a drive unit. In one embodiment, the drive unit includes one or more cables that provide, e.g., power and control signals from the base unit to the rotary unit. As the relative rotation increases, the cables may be stressed until they fail or become disconnected at one of their ends. For example, as the rotary unit rotates, the cables may wind around a pivot point of the rotary unit. If the rotary unit rotates too much relative to the base unit, the cables may break or become disconnected which results in the rotary unit losing power or controllability.

In the embodiments herein, a control system in the drive unit monitors the relative rotation between the rotary unit and the base unit. If the drive unit wants to perform an action (e.g., a turn) which would change the relative rotation, the control system determines whether performing that action would cause the relative rotation to exceed a predefined maximum rotation value (e.g., 270 degrees). If so, the control system determines which rotational direction of the rotary unit or the base unit would cause the relative rotation to exceed the maximum rotation value and instead instructs the transportation to use the opposite rotational direction. For example, if turning the base unit counterclockwise to perform a left turn (while maintaining the current orientation of the rotary unit) would cause the relative rotation to exceed the maximum value, the control unit instead instructs the base unit to turn clockwise in order to perform the left turn. That is, instead of rotating 90 degrees in the counterclockwise direction to turn left, the base unit rotates 270 degrees in the clockwise direction. While rotating clockwise rather than counterclockwise to perform the left turn may take more time, doing so "unwinds" (i.e., decreases) the relative rotation between the rotary unit and the base unit so the maximum rotation value is not exceeded and stress on the cable is avoided (or reduced).

Figure 1:
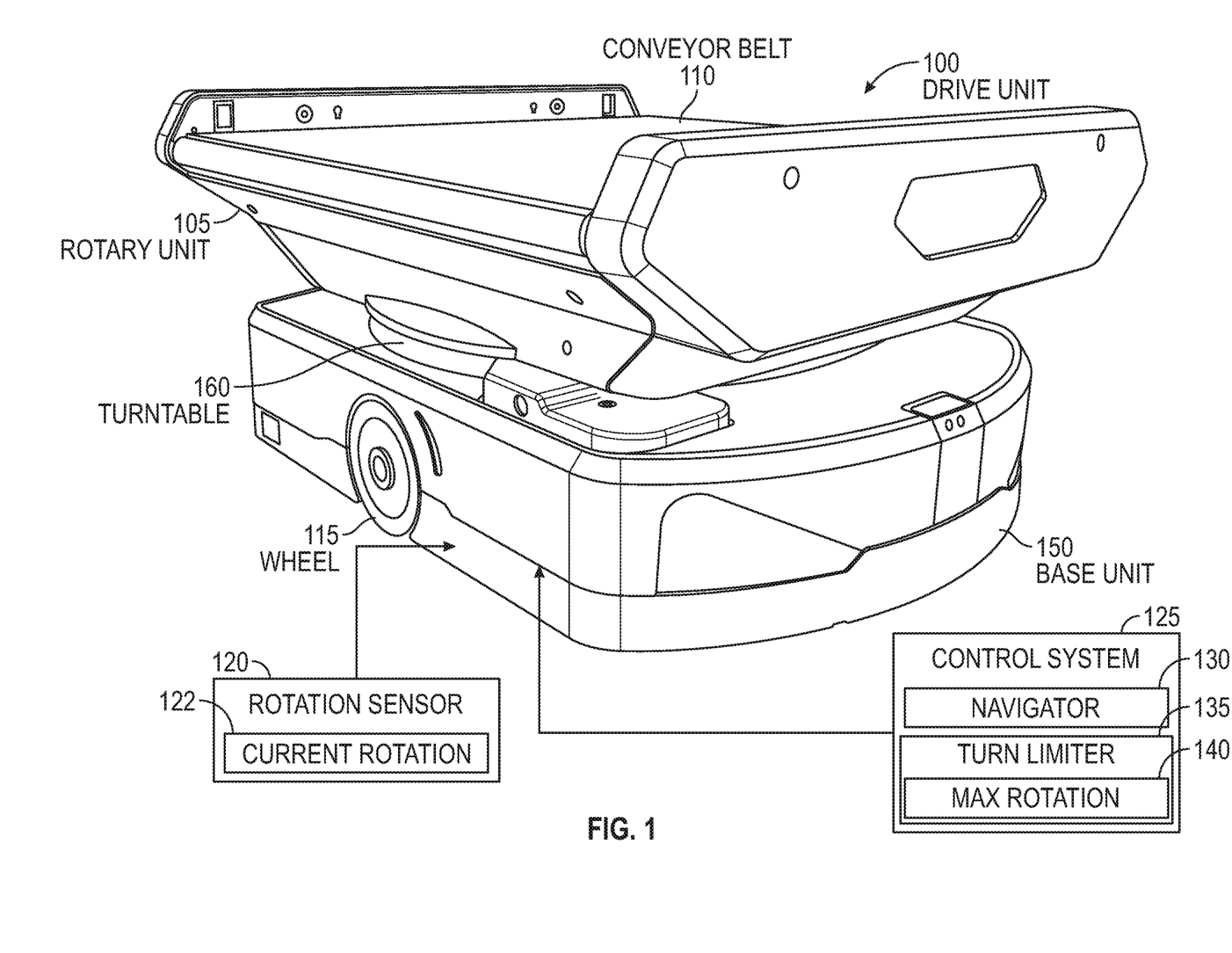
FIG. 1 illustrates a transportation device that includes a rotary unit, according to one embodiment described herein.

FIG. 1 illustrates a transportation device 100 that includes a rotary unit 105 and a base unit 150, according to one embodiment described herein. In FIG. 1, the rotary unit 105 is mounted on the base unit 150 via a turntable 160 to form a package-carrying surface. In this example, the rotary unit 105 includes a conveyor belt 110 on which an item (e.g., a package) can rest when being moved through an environment (e.g., a warehouse). The conveyor belt 110 provides means for loading packages onto the drive unit 100 and unloading packages off the vehicle 100. For example, the drive unit 100 may use the conveyor belt 110 to load a package at a first location in a warehouse, move the package to a second location in the warehouse, and then eject the package into a storage container or chute. However, the embodiments herein are not limited to drive units 100 with conveyor belts 110 but can use other types of powered loading or unloading mechanisms such as dump trays, rollers, and the like. Further still, in some embodiments, the rotary unit 105 may not include any type of loading/unloading mechanism. For example, rather than being used to carry packages, the transportation may be used to carry racks that store multiple items. For example, the drive unit 100 may drive underneath the rack and then use a lift to raise the rotary unit upwards into contact with the bottom shelf of the rack, thereby lifting the rack in the air (e.g., the legs of the rack are lifted off the ground). The drive unit 100 can then move the rack through the warehouse before lowering the rotary unit to place the rack in the same or a different location in the warehouse. In that example, the top surface of the rotary unit 105 may not include a loading/unloading mechanism.

The base unit 150 includes one or more wheels 115 for moving the drive unit 100 through an environment, but can include any suitable type of movement system such as tracks, sleds, an air-cushion (e.g., a hovercraft), and the like. In general, the drive unit 100 can navigate the environment by making turns that can change the orientation of the base unit 150 (e.g., cause the base unit to face in different directions). While turning (or rotating) the base unit 150, the drive unit 100 may, in parallel, rotate the rotary unit 105 using the turntable 160 such that a relative rotation between the rotary unit 105 and the base unit 150 is changed.

In one embodiment, as the base unit 150 changes directions in the environment, the rotary unit 105 may rotate the turntable 160 such that its orientation relative to the environment (e.g., the aisles of the warehouse) remains unchanged. For example, as the base unit 150 turns from one aisle in a warehouse to move down a second, perpendicular aisle, the orientation of the rotary unit 105 remains the same. One advantage of doing so is that the width of the aisles does not need to account for the diagonal dimension of the rotary unit 105. As shown in FIG. 1, the rotary unit has a substantially rectangular top surface, and as such, the diagonal dimension of the top surface is larger than the width and length dimensions. If the top surface could not rotate (i.e., the vehicle 100 did not include a rotary unit 105 with accompanying turntable 160, but instead the orientation of the top surface was fixed relative to the orientation of the base unit 150), each time the base unit 150 turns the top surface also changes orientation which means the layout of the warehouse must account for the diagonal dimensions of the top surface. The diagonal dimension would therefore be a limiting dimension with respect to performing maneuvers in the aisles of a warehouse. For example, the aisles would have to be designed so that they are at least as wide as the diagonal dimension of the top surface so that when the vehicle turns (or pivots) the top surface does not strike objects at the sides of the aisles. However, with the rotary unit 105, the base unit 150 can change directions and orientation while the orientation of the rotary unit 105 remains the same with respect to the layout of the warehouse. Thus, as the base unit 150 turns from one aisle to a perpendicular aisle, the orientation of the rotary unit 105 can remain the same. As such, the layout of the warehouse accounts for only the width or length of the top surface of the rotary unit 105, rather than its diagonal dimension. Further, not only does the layout save space by avoiding the diagonal of the rotary unit 105 but also save space by avoiding the diagonal clearance of whatever item being carried by the rotary unit 105. For example, the item or package may overhang the rotary unit (i.e., is wider than the conveyor belt on which the item is disposed). The techniques herein mean the layout of the warehouse can account for the width and length of the item rather than its diagonal dimension. As a result, the density of the warehouse can be increased (since the aisles can be narrower than the diagonal dimension of the rotary unit) or the size of the top surfaces of the drive units 100 can be increased to accommodate larger packages, relative to using drive units 100 with non-rotatable top surfaces.

However, in one embodiment, the rotary unit 105 may not be infinitely rotatable. That is, the turntable 160 may not be able to rotate as much as desired relative to the base unit 150. In one embodiment, the transportation vehicle 100 may include one or more electrical wires (e.g., one or more cables) that connect at one end to the base unit 150 and at another end to the rotary unit 105. These cables (not shown in FIG. 1) may provide power and controls signals to the rotary unit for, e.g., controlling motors of the rotary unit 105 and the conveyor belt 110, controlling the rotation of the rotary unit 105, and activating/deactivating the conveyor belt 110. Because the cables are connected to both the base unit 150 and the rotary unit 105, changing the relative rotation between these components affects the cables. For example, the greater the relative rotation, the more the cables wrap around a pivot point of the rotary unit 105, or the more the cables stretch. At a limit, the cables will prevent any further relative rotation between the rotary unit and the base unit, or the cables (and/or the rotating mechanism coupling the rotary unit and base unit) will break. Thus, the drive unit 100 can include means for tracking, and reducing the relative rotation between the rotary unit 105 and the base unit 150.

While the embodiments herein discuss cables as the reason for limiting the relative rotation, the embodiments herein can be used for any reason. For example, it may be desirable to limit the relative rotation because of the particular structure used control the rotation of the rotary unit 105 which may be able to rotate only so far in the clockwise and counterclockwise directions. For instance, rather than a rotary unit 105 that can rotate infinitely (assuming there are no cables), the rotary unit may use a screw type connection with the base unit 150 such that it can only rotate so far in either direction before it reaches a maximum rotation, or becomes unscrewed from the base unit 150. Thus, the embodiments herein can be used with drive units that do not use cables (e.g., where a slip ring is used to provide power and control signals to the rotary unit 105) but nonetheless want to limit the relative rotation between the rotary unit 105 and the base unit 150.

The drive unit 100 also includes a rotation sensor 120 and a control system 125 for limiting the relative rotation between the rotary unit 105 and the base unit 150. The rotation sensor 120 can be any mechanical, electrical, or optical sensor that can provide an output used to determine the relative rotation between the rotary unit 105 and the base unit 150. The rotation sensor 120 can continuously or periodically (e.g., before or while performing an action that changes the relative rotation) provide data that can be used to derive a current rotation 122 between the rotary unit 105 and the base unit 150 (e.g., a current relative rotation).

The control system 125 can include software elements, firmware elements, hardware elements, and combinations thereof that control the relative rotation. In this embodiment, the control system 125 includes a navigator 130 which provides high-level navigational instructions to the base unit 150, and a turn limiter 135 for providing low-level movement instructions to the base unit 150 and the rotary unit 105. In one embodiment, the navigator 130 may be a software application that is unaware of any type of restriction or control of the relative rotation between the rotary unit 105 and the base unit 150. Stated differently, the navigator 130 can programmed without ensuring that the relative rotation does not, e.g., cause damage to cables connecting the base unit 150 and the rotary unit 105 as the drive unit 100 traverses the environment. In contrast, the turn limiter 135 may be a firmware application (or software driver) that serves as an intermediary between the navigator 130 and the motors controlling the wheels 115 of the base unit 150 and the orientation of the rotary unit 105. In one embodiment, the turn limiter 135 controls these motors to ensure that the relative rotation does not harm the cables. For example, the navigator 130 can issue a high level command to the turn limiter 135 such as "turn left" and in response the turn limiter 135 can provide instructions to the motors to (i) change to the orientation of the base unit 150 to perform the left turn (ii) rotate the rotary unit 105 such that its orientation remains unchanged during the turn and (iii) ensure the relative rotation does not cause an undesired action (e.g., damage cables or cause the rotary unit 105 to become unscrewed).

In one embodiment, the turn limiter 135 stores a predefined maximum rotation 140 which is a value indicating the maximum relative rotation between the rotary unit 105 and the base unit 150. The maximum rotation 140 may be one value or two values. For example, the maximum rotation 140 may be the same value regardless of the direction of rotation—e.g., the relative rotation cannot rotate more than 270 degrees from a starting position in the clockwise direction and more than 270 degrees from the starting position in the counterclockwise direction. In another embodiment, the maximum rotation 140 may be different depending on the direction, which may be due to the arrangement of the cabling connecting the base unit 150 and the rotary unit 105—e.g., a maximum of 270 degrees from the starting position in the clockwise direction but a maximum of 300 degrees from the starting position in the counterclockwise direction.

In one embodiment, the maximum rotation 140 is less than 360 degrees. For example, the relative rotation may be measured relative to a starting position where a front side of the rotary unit 105 is aligned with a front side of the base unit 150. The maximum rotation 140 may indicate that the rotary unit 105 and base unit 150 should not rotate more than the maximum rotation 140 (e.g., 270 degrees) in a clockwise or counterclockwise direction relative to the starting position. Put differently, the rotary unit 105 should not rotate in either direction such that its front face moves more than 270 degrees from the front side of the base unit 150. Of course, because both the base unit 150 and the rotary unit 105 can rotate, it is equally valid to say that the base unit 150 (or a combination of rotation by the rotary unit 105 and the base unit 150) should not rotate in either direction such that its front face moves more than 270 degrees from the front side of the rotary unit 105.

In other embodiments, the maximum rotation 140 is more than 360 degrees. For example, the rotation sensor 120 may track the number of complete rotations that the rotary unit 105 performs relative to the base unit 150. The maximum rotation 140 may indicate that the relative rotation cannot perform more than two full rotations.

As discussed below, in one embodiment, the turn limiter 135 controls the rotation of the base unit 150 to ensure the relative rotation does not match or exceed the maximum rotation 140. That is, when navigating the environment based on commands received from the navigator 130, the turn limiter 135 may determine how to rotate or turn the base unit 150 or the rotary unit such that the relative rotation is at or below the maximum rotation.

Figure 2:
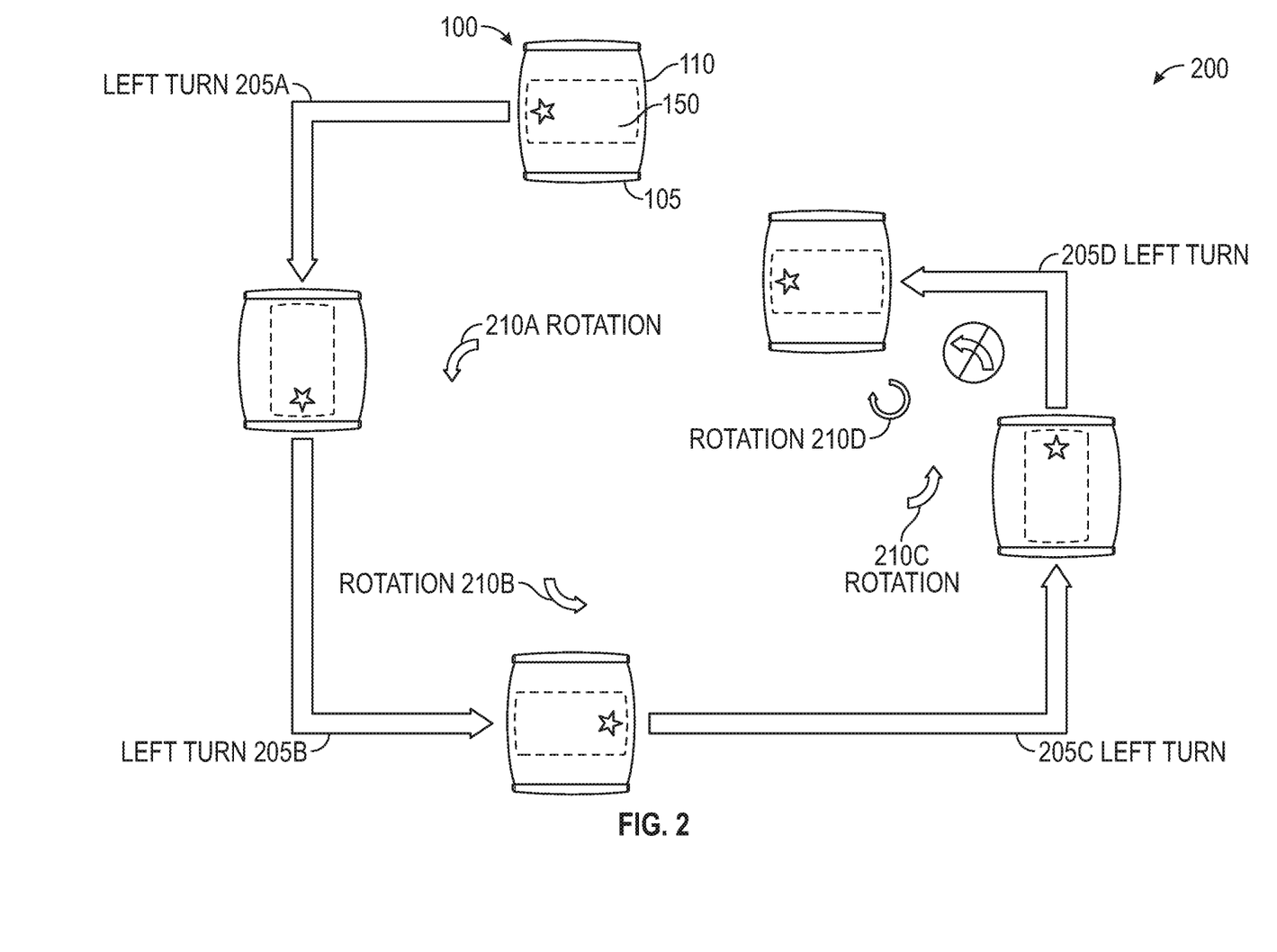
FIG. 2 illustrates a relative rotation between a rotary unit and a base unit while performing multiple turns, according to one embodiment described herein.

FIG. 2 illustrates a relative rotation between a rotary unit and a base unit while performing multiple turns, according to one embodiment described herein. In FIG. 2, it is assumed that the drive unit 100 has a maximum rotation value of 270 degrees. That is, the relative rotation of the rotary unit 105 and the base unit 150 cannot exceed 270 degrees.

FIG. 2 is a top view of the drive unit 100 navigating an environment by performing a sequence of four left turns 205A-D. For clarity, the conveyor belt 110 is transparent such that the orientation of the base unit 150 (illustrated using dashed lines) can be seen. A front face of the base unit 150 is indicated by the star which also indicates the direction the drive unit 100 travels. The path of the vehicle 100 begins at the top of FIG. 2 with the base unit 150 facing left. Further, it is assumed that the relative rotation between the rotary unit 105 and the base unit 150 at the beginning of the path is zero. That is, the rotary unit 105 and the base unit 150 are aligned at a starting position. As discussed below, the drive unit 100 monitors the relative rotation such that the relative rotation does not exceed the maximum rotation (e.g., 270 degrees) in either the clockwise or counterclockwise directions.

To perform the first left turn 205A, the base unit 150 rotates 90 degrees in the counterclockwise direction as indicated by the rotation 210A to a designated heading. While rotating the base unit 150, the drive unit 100 also rotates the rotary unit 105 in the clockwise direction so that the orientation of the rotary unit 105 remains the same as it did before the left turn 205A was performed. In fact, when performing all the left turns 205A-D in FIG. 2, the rotary unit 105 is rotated counter to the direction the base unit 150 turns (or rotates) so that the orientation of the rotary unit 105 does not change. Doing so has the advantage discussed above where the layout of the environment 200 can be designed to account for the length and width of the rotary unit 105, but not its diagonal dimension.

After performing a first left turn 205A, the relative rotation between the rotary unit 105 and the base unit 150 is 90 degrees. The drive unit 100 then performs a second left turn 205B to a designated heading by rotating or turning the base unit 150 as indicated by the rotation 210B. Again, the rotary unit 105 is rotated in the opposite direction so that its orientation is maintained throughout the turn 205B. After performing the left turn 205B, the relative rotation has increased to 180 degrees.

The vehicle 100 then performs a third left turn 205C by rotating or turning the base unit 150 as shown by the rotation 210C. The rotary unit 105 rotates in the clockwise direction by another 90 degrees such that the relative rotation between the rotary unit 105 and the base unit 150 has increased to 270 degrees—i.e., the maximum rotation allowed or the maximum rotation 140 illustrated in FIG. 1. Thus, when the drive unit 100 decides (or receives an instruction) to perform a fourth left turn 205D, the turn limiter in the vehicle 100 knows that performing this action may result in the relative rotation increasing beyond the maximum rotation if the orientation of the rotary unit 105 is to remain unchanged. In this case, if the base unit 150 again turns 90 degrees in a counterclockwise direction, the rotary unit 105 must rotate another 90 degrees in the clockwise direction, thereby increasing the relative rotation to exceed the maximum rotation.

Instead, the turn limiter instructs the base unit to turn or rotate in the opposite direction—i.e., clockwise—to make the left turn 205D. If the base unit 150 were to rotate counterclockwise, it could perform the left turn 205D by rotating 90 degrees, however, as shown by the rotation 210D, the turn limiter instead instructs the base unit to rotate 270 degrees in the clockwise direction to perform the left turn 205D. To maintain the rotary unit 105 in its same orientation, the turn limiter instructs it to rotate 270 degrees in the counterclockwise direction. As a result, this reduces the relative rotation from 270 degrees to zero. That is, when performing the left turns 205A-C, the relative rotation increased to 270 degrees as the rotary unit made three 90 degree rotations in the clockwise direction relative to the base unit 150. However, when performing the left turn 205D, the rotary unit 105 performs a 270 degree rotation in the counterclockwise direction, thereby reducing the relative rotation. After performing the left turn 205D, the faces in the base unit 150 and the rotary unit 105 are again aligned in the starting position—i.e., the same alignment when the drive unit 100 started the path.

The decision by the turn limiter to instruct the base unit 150 to turn in a less efficient manner (e.g., perform a 270 degree turn in the clockwise direction rather than a 90 degree turn in the counterclockwise direction) to ensure the relative rotation does not exceed the maximum rotation is referred to as an "unwind" since this action results in unwinding (i.e., reducing) the relative rotation between the rotary unit 105 and the base unit 150 from a starting position (or a reference point or orientation). In this manner, the orientation of the rotary unit 105 can remain constant as the vehicle 100 traverses the environment 200 while also ensuring the relative location does not exceed the maximum rotation.

While FIG. 2 illustrates performing four left turns, which can result in an unwind, four consecutive right turns would also result in an unwind. However, in that case, the rotary unit would perform three 90 degree rotations in the counterclockwise direction followed by a 270 degree unwind in the clockwise direction. The base unit 150 would perform three 90 degree rotations in the clockwise direction followed by a 270 degree unwind in the counterclockwise direction.

Figure 3:
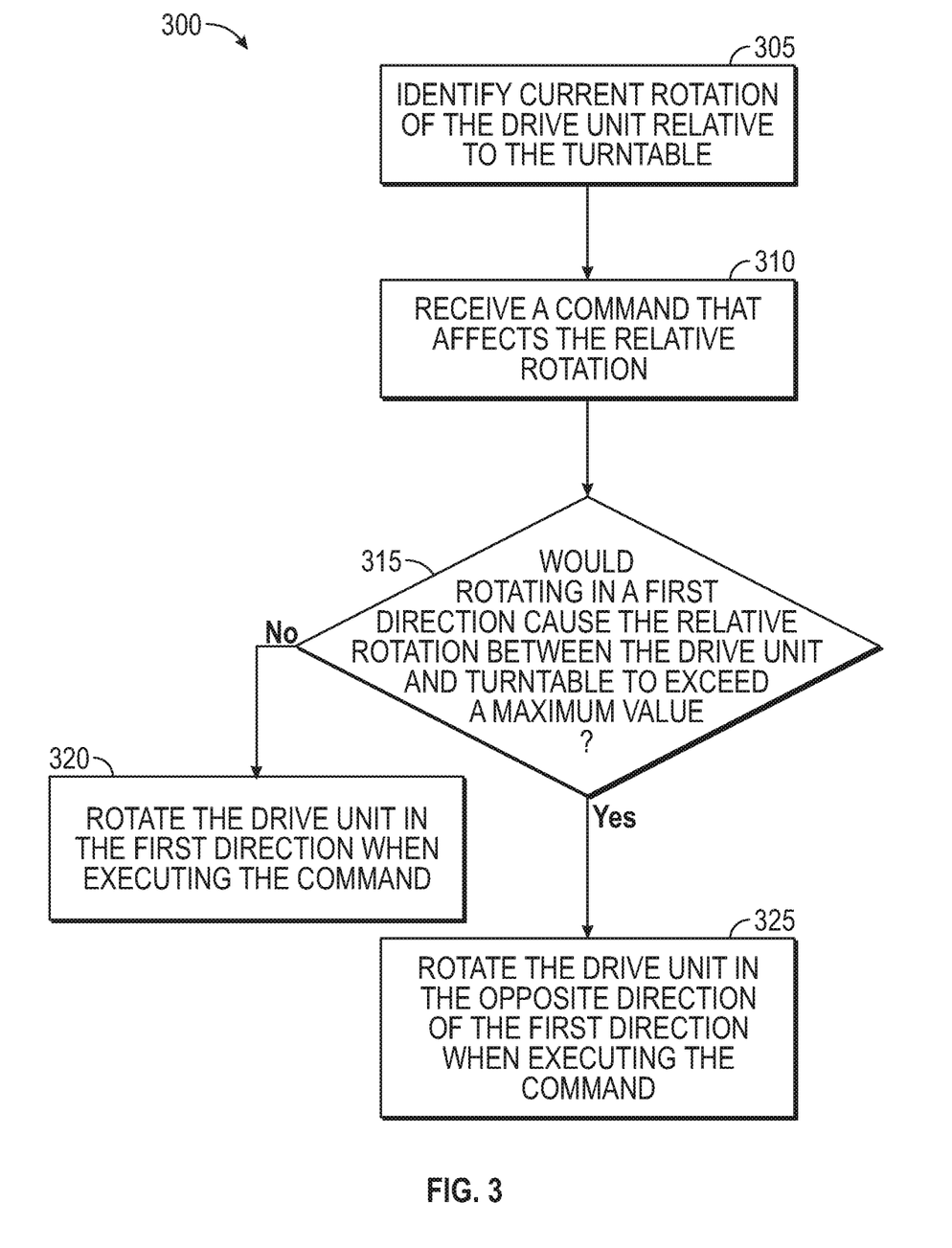
FIG. 3 is a flowchart for limiting the relative rotation between the rotary unit and the base unit, according to one embodiment described herein.

FIG. 3 is a flowchart of a method 300 for limiting the relative rotation between the rotary unit and the base unit, according to one embodiment described herein. At block 305, the rotation sensor in the drive unit identifies a current rotation (e.g., a current relative rotation) of the base unit relative to the rotary unit. As mentioned above, the embodiments herein are not limited to any particular type of sensor for detecting the current rotation, and can include mechanical, electrical, magnetic, and optical sensors.

At block 310, the turn limiter receives a command that affects the relative rotation between the base unit and the rotary unit, such as left or right turns. Other commands that may affect the relative rotation are pivot commands (where the base unit pivots without moving locations) or reverse commands where the base unit reverses directions. Other commands can include rotating the rotary unit (e.g., to load or unload packages) while the base unit remains stationary. Thus, the embodiments herein can be applied to any command that can change the relative rotation between the rotary unit and the base unit. These commands can be generated by a navigation system on the transportation system (such as the control system 125 and the navigator 130 in FIG. 1) or be transmitted wirelessly to the drive unit by an external controller.

At block 315, the turn limiter determines whether rotating in a first direction will cause the relative rotation between the base unit and the rotary unit to exceed a maximum value (e.g., a maximum rotation). In one embodiment, the turn limiter compares the current rotation determined at block 305 to the value of the relative rotation after the command is performed. To do so, the turn limiter may choose a direction (e.g., the first direction) to rotate the base unit or the rotary unit when executing the command. In some embodiments, executing command may rotate both the base unit and the rotary unit. For example, the turn limiter may choose the first direction based on which direction is most time efficient or most power efficient. Referring to FIG. 2 as an example, when performing the left turns 205, it is more time efficient to rotate the base unit 150 counterclockwise. It may also be more power efficient since the base unit 150 has to rotate less to perform the left turns when rotating counterclockwise rather than clockwise. In one embodiment, for each command, the turn limiter may select the most efficient rotational direction (or directions) for performing that command and then determine whether turning in that direction would result in the relative rotation exceeding the maximum rotation value. This determining can occur before the drive unit begins executing the command, but can also occur while executing the command (when the vehicle begin rotating in the first direction) which may result in the vehicle having to change directions if the relative rotation reaches the maximum rotation.

If rotating in the first direction does not exceed the maximum rotation, the method 300 proceeds to block 320 where the turn limiter instructs the base unit (or the rotary unit) to rotate in the first direction when executing the command. Rotating in the first direction may cause the relative rotation to increase or decrease. For example, assuming the drive unit was at the starting position and has already performed two left turns by rotating the base unit 180 counterclockwise (while the rotary unit has maintained its orientation) and is now commanded to perform a right turn, rotating the base unit clockwise 90 degrees while maintaining the rotary unit in its current orientation reduces the relative rotation to 90 degrees and will also likely be more time efficient than performing a 270 degrees counterclockwise rotation. In contrast, if the command is another left turn, rotating the base unit counterclockwise 90 degrees increases the relative rotation to 270 degrees. In general, whichever direction is initially selected, the turn limiter can ensure that rotating the base unit or rotary unit in that direction does not result in the relative rotation exceeding the maximum rotation.

However, if rotating in the first direction would exceed the maximum rotation, the method 300 instead proceeds to block 325 where the turn limiter rotates the base unit (or the rotary unit) in the opposite direction of the first direction when executing the command. That is, the turn limiter performs an unwind by rotating the base unit or rotary unit in the opposite direction, thereby reducing the relative rotation. As mentioned above, doing so may require more time than rotating in the first direction. That is, performing the left turn 205D in FIG. 2 by rotating the base unit 150 clockwise 270 degrees may take more time than rotating the base unit counterclockwise 90 degrees, but doing so ensures the relative rotation does not exceed the maximum rotation.

Similarly, if the relative rotation is at 270 degrees and the command requires the rotary unit to change its orientation to load or unload a package (while the base unit remains stationary), rotating in one direction may result in the relative rotation exceeding the maximum rotation but rotating in the opposite direction will decrease the relative rotation. In that instance, the method 300 causes the turn limiter to instruct the rotary unit to perform an unwind by rotating in the opposite direction, even though that direction may be less efficient. In this manner, the method 300 tracks the relative rotation and ensures that executing a command does not exceed the maximum rotation. If it does, the method 300 performs an unwind when executing the command such that the maximum rotation is not exceeded and the relative rotation is reduced.

Figure 4:
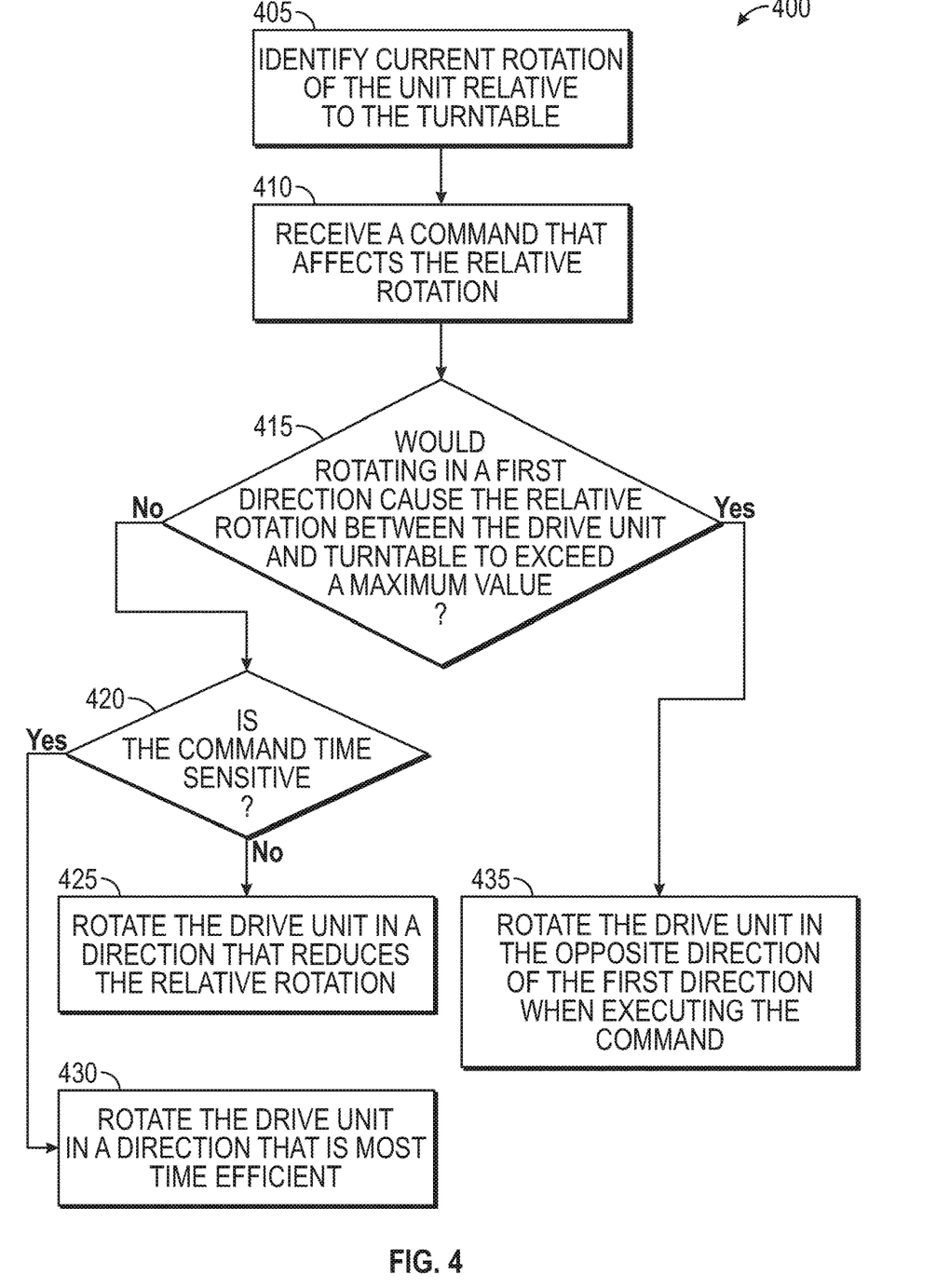
FIG. 4 is a flowchart for limiting the relative rotation between the rotary unit and the base unit, according to one embodiment described herein.

FIG. 4 is a flowchart of a method 400 for limiting the relative rotation between the rotary unit and the base unit, according to one embodiment described herein. Blocks 405-415 in the method 400 are the same as the blocks 305-315 in method 300 in FIG. 3, and thus, will not be described in detail here.

Assuming that rotating in the first direction does not exceed the maximum rotation, the method 400 proceeds from block 415 to block 420. Unlike in the method 300 where the turn limiter permits the base unit or the rotary unit to rotate in the first direction to execute the command, in the method 400 the turn limiter first determines whether the command is time sensitive. That is, some received commands may be time sensitive (e.g., should be performed in the most time efficient method available) while others are not (e.g., can be performed in a less time efficient manner). For example, some types of commands such as a turn or pivot may not be time sensitive while a load or unload command may be time sensitive (since other devices may be waiting on the drive unit to execute the command). In another embodiment, a command may be time sensitive based on the current location of the drive unit. For instance, a turn command while the drive unit is navigating between aisles in a warehouse may not be time sensitive, but a turn command received when the vehicle is in a queue (e.g., a load/unload queue) may be time sensitive. In another embodiment, a turn command at a busy intersection or a main path in the warehouse may be time sensitive while a turn command between two aisles is not. In another embodiment, a command may be time sensitive based on congestion around the drive unit. For example, a turn command when the vehicle is proximate (e.g., within ten feet) of three or more other drive unit may be time sensitive while a turn command when there are two or fewer vehicles close by is not.

If the command is not time sensitive, the method 400 proceeds to block 425 where the turn limiter rotates the base unit in a direction that reduces the relative rotation when executing the command. Stated differently, because the navigation system does not care how long (within reason) it takes for the drive unit to execute the command, the turn limiter can use the command to unwind the relative rotation between the rotary unit and the base unit. For example, rather than performing a left turn by rotating the base unit counterclockwise 90 degrees (which may take 1 second), the turn limiter rotates the base unit clockwise 270 degrees which may take 3 seconds) assuming that doing so would reduce the relative rotation. That is, the turn limiter can first determine which rotational direction would reduce the relative rotation and then use that direction when executing the command.

In one embodiment, the turn limiter can also determine the amount of unwind to perform at block 425. For example, the command can be performed to reduce the relative rotation by a first amount or by a greater, second amount. For instance, the drive unit may rotate 270 degrees clockwise when executing the command to reduce the relative rotation by 180 degrees or instead rotate 630 degrees clockwise when executing the command to reduce the relative rotation by 540 degrees. Doing the later may take more time, but may be desired if the drive unit is about to enter a time sensitive area in the environment (such as the queue 505 described in FIG. 5 below).

If the command is time sensitive, the method 400 instead proceeds to block 430 where the turn limiter rotates the base unit or rotary unit in a direction that is most time efficient (e.g., the first direction). That is, in one embodiment, the first direction that was evaluated at block 415 may be the most time efficient direction. Thus, if the command is time sensitive, at block 430, the turn limiter executes the command by rotating in the first direction. Doing so either decreases or increases the relative rotation, but the turn limiter has already ensured that it will not exceed the relative rotation at block 415.

Returning to block 415, if rotating in the first direction would exceed the maximum rotation value, then the method 400 proceeds to block 435, which is the same as block 325 in FIG. 3 where the base unit or rotary unit is rotated in the opposite direction than the first direction to perform an unwind when executing the command.

Figure 5:
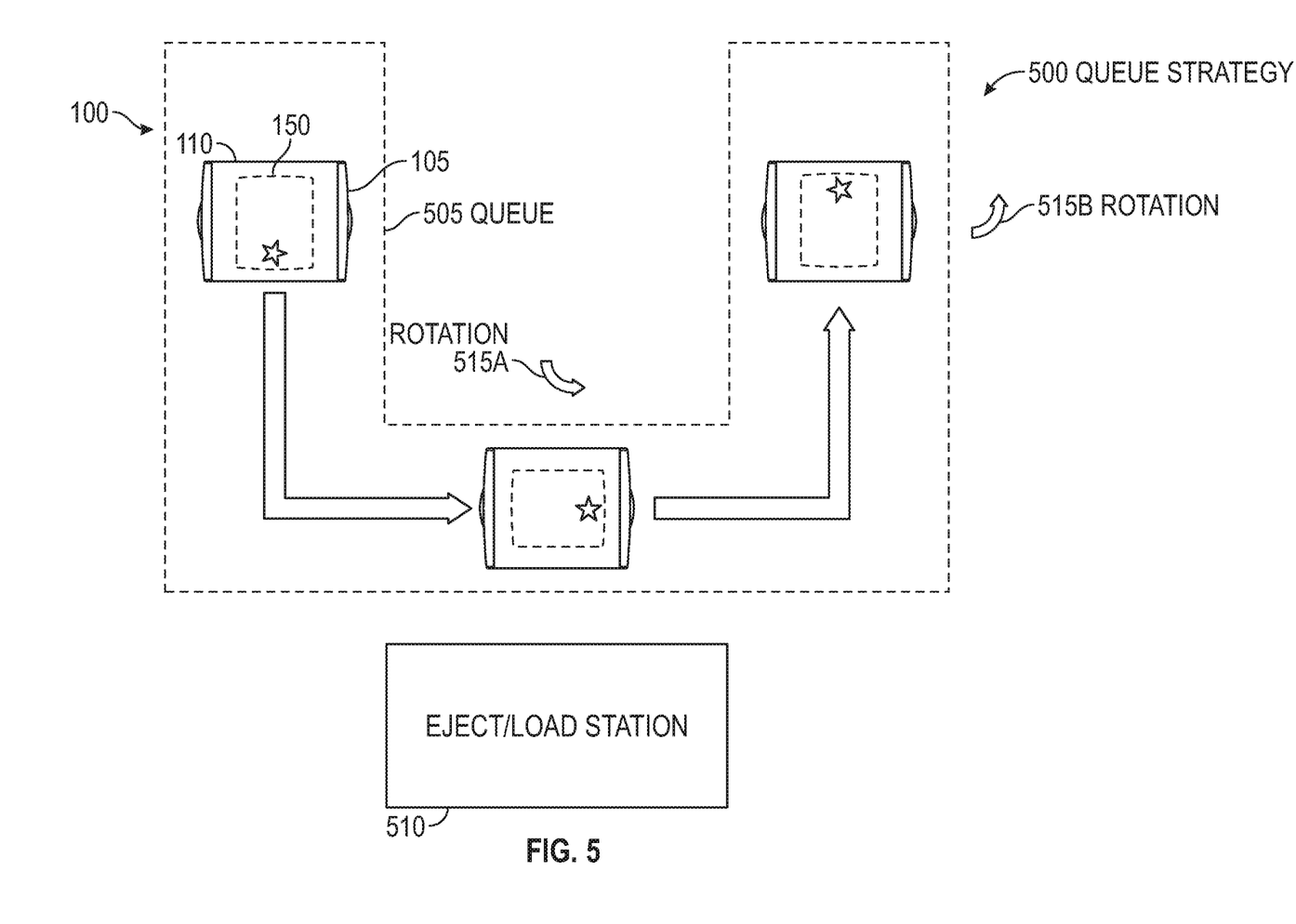
FIG. 5 illustrates a strategy for avoiding having to unwind the relative rotation during a time sensitive process, according to one embodiment described herein.

FIG. 5 illustrates a queue strategy 500 for avoiding having to unwind the relative rotation during a time sensitive process, according to one embodiment described herein. As shown, FIG. 5 illustrates a queue 505 navigated by drive units 100. Specifically, the queue 505 is for an eject/load station 510 where the drive units 100 use their conveyor belts 110 to eject or load items. For example, the station 510 can be a chute where the vehicles 100 activate the conveyor belts 110 to eject packages into the chutes. Alternatively, the station 510 can itself include a conveyor belt that transfers packages from the station 510 onto the conveyor belts 110 of the drive units 100.

FIG. 5 illustrates a single drive unit 100 navigating the queue 505. Specifically, FIG. 5 illustrates the vehicle 100 at an ingress portion of the queue 505, a load/unload position of the queue 505, and an egress portion of the queue 505. To traverse the queue 505, the drive unit 100 performs two left turns.

Traversing the queue 505 is a time sensitive process since there may be multiple vehicles 100 in the queue 505 simultaneously, where the vehicles 100 in the back of the queue 505 are waiting for the vehicle in front of them to complete their actions. That is, the efficiency at which the vehicles 100 are able to move through the queue 505 depends on the amount of time it takes for the vehicles 100 to perform the two left turns and eject/load the items at the station 510.

As mentioned above, an unwind may require rotating the base unit 150 or the rotary unit 105 in a less time efficient direction. Thus, performing an unwind when executing one of the left turns in the queue 505 may increase the time the vehicle 100 spends in the queue 505, and thus, reduce the overall efficiency of the queue 505. As such, in one embodiment, the queue strategy 500 includes ensuring that the drive units 100 do not perform an unwind when in the queue 505. Put differently, the queue strategy 500 ensures that the drive units 100 can rotate in the most time efficient manner when executing the two left turns in the queue 505.

In one embodiment, the queue strategy 500 requires the relative rotation to be at least 180 degrees less than the maximum rotation value when entering the queue 505. For example, if the relative rotation is not less than 180 degrees, the turn limiter may execute an unwind before entering the queue 505 in an unwind stage 520 before the queue 505. In another embodiment, the queue strategy 500 instructs the drive unit 100 to perform an unwind before executing the two left turns. In this example, a drive unit 100 may be permitted to enter the queue 505 even when its relative rotation is more than 180 degrees less than the maximum rotation, but while at the ingress portion of the queue 505, the turn limiter instructs the base unit 150 and rotary unit 105 to perform an unwind. For example, while the vehicle 100 is waiting in the ingress portion for vehicles 100 in front of it to move up, the vehicle 100 can use that idle time to perform the unwind. Thus, when it is its turn to perform the turns, the relative rotation of the vehicle 100 has been reduced.

In another embodiment, the queue strategy 500 may include performing method 400 to unwind the relative rotation during non-time critical commands executed before the drive unit 100 reaches the queue 505. For example, the drive unit 100 may traverse a portion of the warehouse before it reaches the queue 505 during which it executes several commands that change the relative rotation. If at least one of these commands is non-time critical, the drive unit can perform an unwind. Thus, by the time the vehicle 100 reaches the queue 505 it is more likely to have a relative location that is less than 180 degrees than the maximum rotation, thereby avoiding performing a special unwind before it enters the queue 505 (or while the vehicle 100 is the unwind stage 520). Moreover, it may be desired to avoid an unwind while leaving the queue 505 since this too can slow down the throughput. Performing the techniques above can make it more likely that an unwind is not necessary in, and immediately after leaving, the queue 505.

As shown in FIG. 5, due to the queue strategy 500, the base unit 150 can perform two counterclockwise 90 degree rotations when executing the two left turns of the queue 505, which is the most time efficient rotational direction for executing the turns. In other words, the queue strategy 500 ensures the base unit 150 did not have to perform an unwind.

Figure 6:
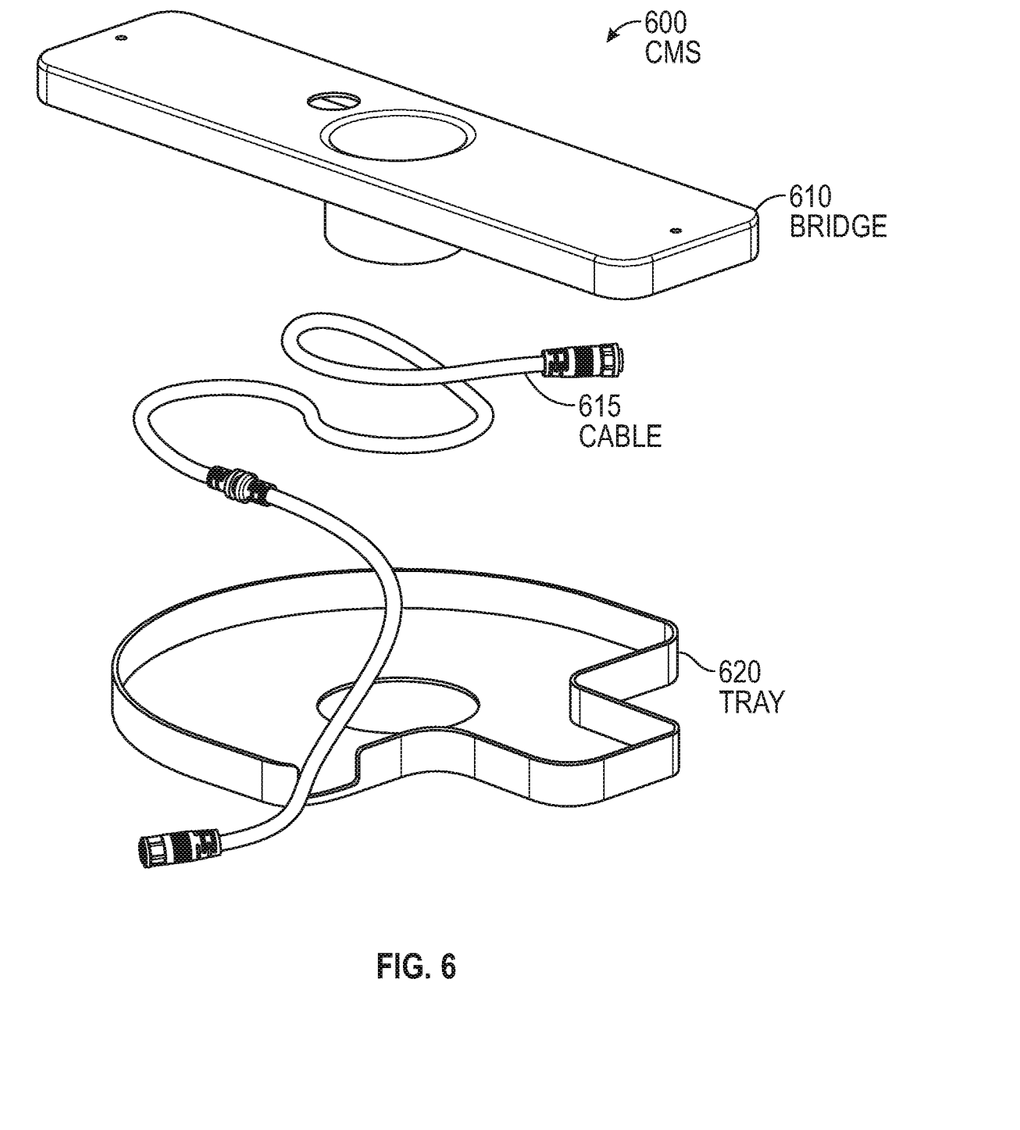
FIG. 6 is an exploded view of a cable management system in a drive unit, according to one embodiment described herein.

FIG. 6 is an exploded view of a cable management system (CMS) 600 in a drive unit, according to one embodiment described herein. FIG. 6 includes a bridge 610, a tray 620, and a cable 615. In one embodiment, the bridge 610 provides support for an upper surface of the rotary unit that transports the item (e.g., a conveyor belt, dump tray, stationary tray, etc.).

A center portion of the bridge 610 extends through a center aperture of the tray 620 which holds the cable 615. While the bridge 610 rotates as the rotary unit rotates, the tray 620 does not. In one embodiment, although not shown, the cable 615 is enclosed in a cable chain that provides flexibility and protection for the cables 615 (which transfers power and control signals between the rotary unit and the base unit). As the bridge 610 rotates, the cable 615 can move and flex in the tray 620. However, using the techniques described above, the turn limiter ensures the relative rotation between the bridge 610 and the tray 620 does not exceed a maximum rotation, where rotation above this value (or values) may damage the cable 615.

Figure 7:
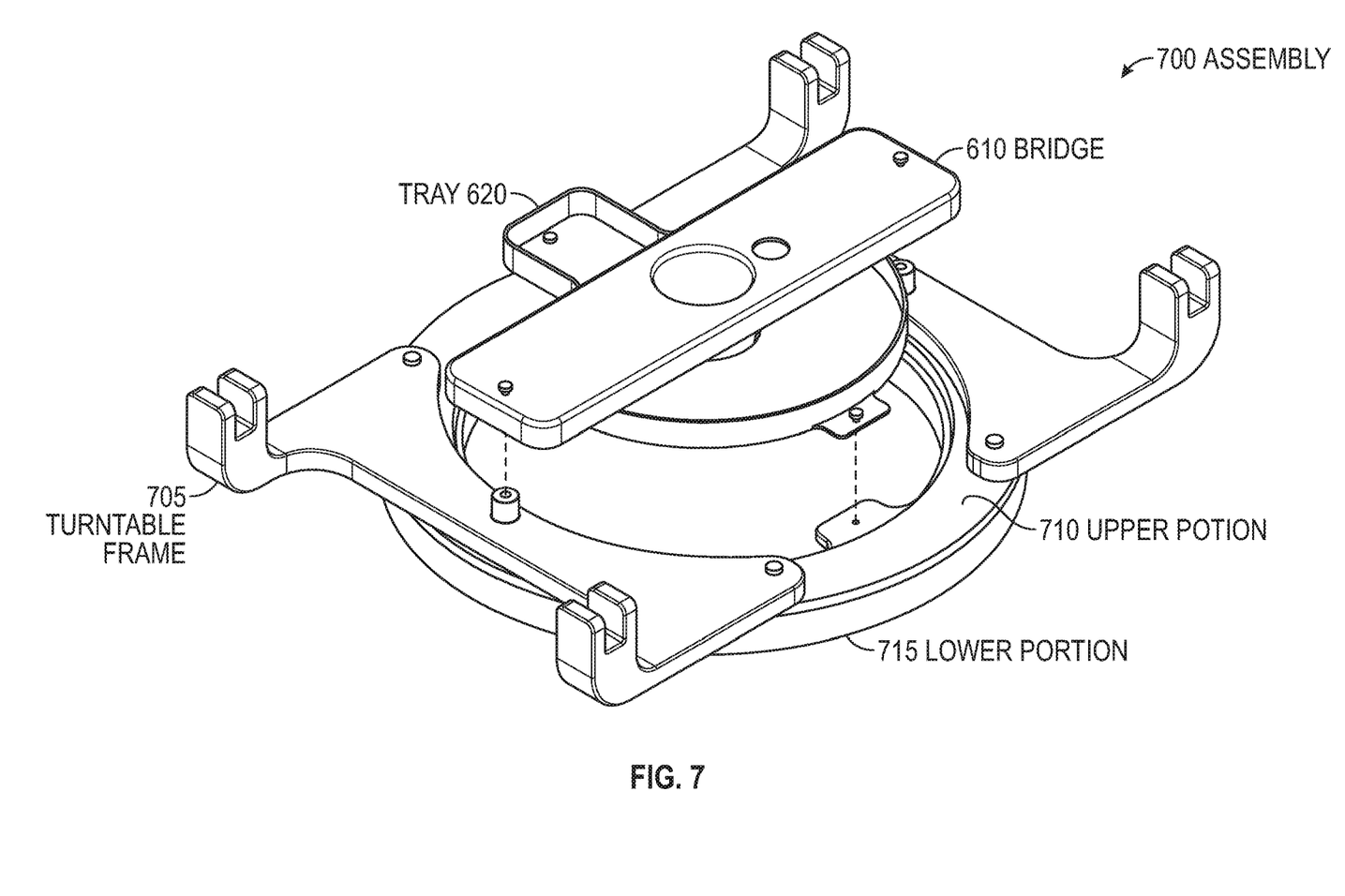
FIG. 7 illustrates coupling the cable management system in FIG. 6 to an assembly, according to one embodiment described herein.

FIG. 7 illustrates coupling the CMS in FIG. 6 to an assembly 700 in a drive unit, according to one embodiment described herein. In addition to the elements in the CMS, the assembly 700 includes a rotary unit frame 705 which is mounted on an upper portion 710 that rotates on top of a lower portion 715. That is, the upper portion 710 and the lower portion 715 may form a turntable (e.g., the turntable 160 illustrated in FIG. 1). In this example, the bridge 610 is connected to the rotary unit frame 705 which is in turn coupled to the upper portion 710. In contrast, the tray 620 is connected to the lower portion 715 which may be rigidly attached to the base unit (not shown). Thus, while the tray 620 and the lower portion 715 do not rotate relative to the base unit, the rotary unit frame 705, the upper portion 710, and the bridge 610 are part of the rotary unit and do rotate relative to the base unit.

Figure 8:
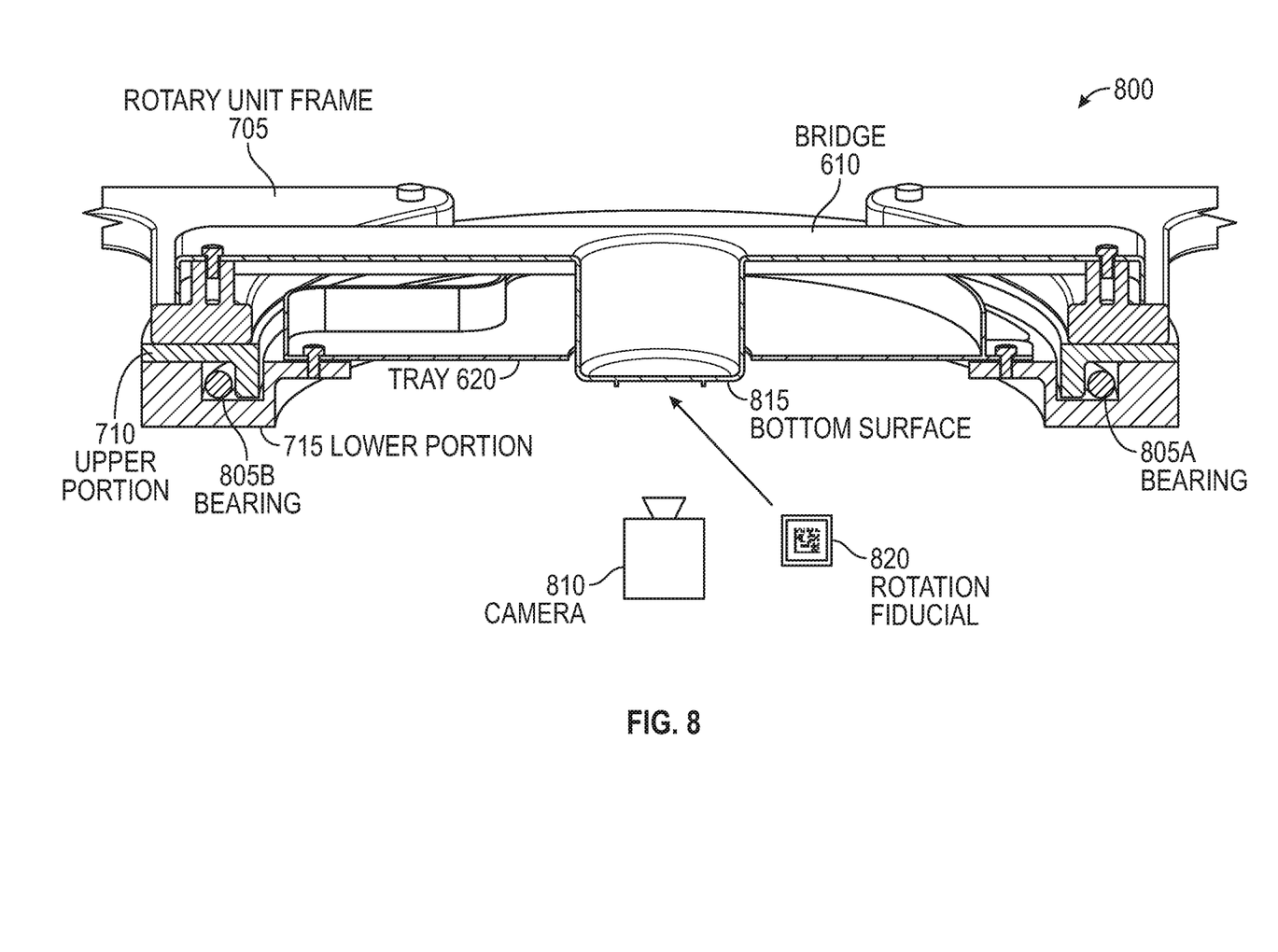
FIG. 8 illustrates a side view of the assembly in FIG. 7, according to one embodiment described herein.

FIG. 8 illustrates a cross-sectional side view 800 of the assembly in FIG. 7, according to one embodiment described herein. As shown, bearings 805A and 805B are disposed between the upper and lower portions 710, 715 to facilitate rotation between these components. However, the embodiments herein are not limited to using bearings 805 to facilitate rotation between the upper and lower portions 710, 715.

FIG. 8 also includes a camera 810 for capturing images of a rotation fiducial 820 disposed on a bottom surface 815 of the bridge 610. That is, the camera 810 is oriented in the base unit in a vertical direction (e.g., faces up) so that its field of view captures the fiducial 820 (e.g., a matrix bar code) on the bottom surface 815. The images captured by the camera 810 can be evaluated to identify the relative rotation between the rotary unit and the base unit. That is, by identifying the rotation of the fiducial 820 relative to a start position, the rotation sensor can identify the current relative rotation of the rotary unit and the base unit. However, the camera 810 and fiducial 820 is just one suitable rotation sensor for determining the relative rotation. As mentioned above, other types of sensors—e.g., mechanical or electrical—can be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    identifying a relative rotation between a rotary unit and a base unit in a drive unit, wherein the base unit comprises a movement system for moving the drive unit in an environment, wherein the drive unit comprises one or more cables connected at one side to the base unit and at a second side to the rotary unit;
    receiving a command to turn the base unit to a designated heading, while maintaining a current orientation of the rotary unit relative to the environment;
    determining that rotating the base unit in a first direction in response to the command will result in the relative rotation exceeding a predefined maximum rotation value that damages the one or more cables; and
    rotating the base unit in a second direction opposite the first direction in response to the command until reaching the designated heading, while maintaining the current orientation of the rotary unit.

2. The method of claim 1, further comprising:
    receiving a second command to turn the base unit, while maintaining the rotary unit in the current orientation;
    determining that rotating the base unit in the first direction in response to the second command will not result in the relative rotation exceeding the maximum rotation value; and
    rotating the base unit in a first direction in response to the second command, while maintaining the rotary unit in the current orientation.

3. The method of claim 1, wherein rotating the base unit in the second direction when executing the command results in the base unit rotating more than the base unit would have if the base unit had rotated in the first direction.

4. The method of claim 1, wherein rotating the base unit in the second direction when executing the command reduces the relative rotation.

5. The method of claim 1, wherein the rotary unit comprises a loading or unloading mechanism that is powered using the one or more cables.

6. A method, comprising:
identifying a relative rotation between a rotary unit and a base unit in a drive unit;
receiving a command that changes the relative rotation between the rotary unit and the base unit when the command is executed by the drive unit;
determining that rotating at least one of the base unit or the rotary unit in a first direction in response to the command results in the relative rotation exceeding a maximum rotation value; and
rotating at least one of the base unit or the rotary unit in a second direction opposite the first direction while executing the command.

7. The method of claim 6, wherein the base unit comprises a movement system configured to at least one of rotate or turn the base unit when navigating an environment.

8. The method of claim 7, further comprising:
transporting an item disposed on the rotary unit from a first location to a second location in the environment using the movement system.

9. The method of claim 6, wherein rotating in the first direction when executing the command is more efficient than rotating in the second direction.

10. The method of claim 9, wherein rotating in the second direction when executing the command results in the base unit rotating more than the base unit would have if the base unit had rotated in the first direction.

11. The method of claim 6, wherein, when executing the command, an orientation of the rotary unit remains constant while an orientation of the base unit changes.

12. The method of claim 6, further comprising:
receiving a second command that changes the relative rotation when the second command is executed by the drive unit;
determining that rotating at least one of the base unit or the rotary unit in the first direction in response to the second command does not result in the relative rotation exceeding the maximum rotation value;
determining that the second command is not time sensitive; and
rotating at least one of the base unit or the rotary unit in the second direction opposite the first direction while executing the command.

13. The method of claim 12, wherein rotating in the second direction when executing the second command results in the base unit rotating more than the base unit would have if the base unit had rotated in the first direction when executing the second command.

14. A computer readable storage medium having computer-readable program code embodied therewith, the computer-readable program code executable by one or more computer processors to perform an operation, the operation comprises:
identifying a relative rotation between a rotary unit and a base unit in a drive unit;
receiving a command that changes the relative rotation between the rotary unit and the base unit when the command is executed by the drive unit;
determining that rotating at least one of the base unit or the rotary unit in a first direction in response to the command results in the relative rotation exceeding a maximum rotation value; and
rotating at least one of the base unit or the rotary unit in a second direction opposite the first direction while executing the command.

15. The computer readable storage medium of claim 14, wherein the base unit comprises a movement system configured to at least one of rotate or turn the base unit when navigating an environment.

16. The computer readable storage medium of claim 15, wherein the operation further comprises:
transporting an item disposed on the rotary unit from a first location to a second location in the environment using the movement system.

17. The computer readable storage medium of claim 15, wherein rotating in the first direction when executing the command is more efficient than rotating in the second direction.

18. The computer readable storage medium of claim 17, wherein rotating in the second direction when executing the command results in the base unit rotating more than the base unit would have if the base unit had rotated in the first direction.

19. The computer readable storage medium of claim 16, wherein the operation further comprises further comprising:
receiving a second command that changes the relative rotation when the second command is executed by the drive unit;
determining that rotating at least one of the base unit or the rotary unit in the first direction in response to the command does not result in the relative rotation exceeding the maximum rotation value;
determining that the second command is not time sensitive; and
rotating at least one of the base unit or the rotary unit in the second direction opposite the first direction while executing the command.

20. The computer readable storage medium of claim 19, wherein rotating in the second direction when executing the second command results in the base unit rotating more than the base unit would have if the base unit had rotated in the first direction when executing the second command.

* * * * *